(12) United States Patent
Fujita et al.

(10) Patent No.: US 6,859,680 B2
(45) Date of Patent: Feb. 22, 2005

(54) NUMERICAL CONTROLLING UNIT HAVING TOOL-BREAKAGE DETECTING FUNCTION

(75) Inventors: Jun Fujita, Mishima (JP); Ichiro Matsumoto, Numazu (JP); Kouichi Katoh, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 54 days.

(21) Appl. No.: 10/375,101

(22) Filed: Feb. 28, 2003

(65) Prior Publication Data

US 2003/0167100 A1 Sep. 4, 2003

(30) Foreign Application Priority Data

Mar. 1, 2002 (JP) ........................................ 2002-055777

(51) Int. Cl.[7] .............................................. G06F 19/00
(52) U.S. Cl. ................................ 700/177; 408/6; 408/9
(58) Field of Search ........................ 700/96, 159, 170, 700/174, 175, 177, 182, 188; 702/182–186; 408/6, 8–13; 318/565, 566, 563, 537, 568.18, 571

(56) References Cited

U.S. PATENT DOCUMENTS

| | | | | |
|---|---|---|---|---|
| 3,665,493 A | * | 5/1972 | Glowzewski et al. | ........ 318/561 |
| 4,456,960 A | * | 6/1984 | Wakai | .......... 700/175 |
| 4,509,126 A | * | 4/1985 | Olig et al. | .......... 700/173 |
| 4,713,770 A | * | 12/1987 | Hayes et al. | ............ 700/175 |
| 4,992,712 A | * | 2/1991 | Fujimoto et al. | .......... 318/569 |
| 5,289,367 A | * | 2/1994 | Sasaki et al. | .............. 700/32 |
| 5,309,074 A | * | 5/1994 | Mizukami | ................. 318/571 |
| 5,317,518 A | * | 5/1994 | Fujita et al. | ................. 700/184 |
| 5,404,308 A | * | 4/1995 | Kajiyama | .................... 700/188 |
| 5,568,028 A | * | 10/1996 | Uchiyama et al. | .......... 318/566 |
| 5,827,020 A | * | 10/1998 | Fujita et al. | ................... 409/80 |
| 5,923,560 A | * | 7/1999 | Ozaki et al. | ................. 700/175 |
| 6,556,879 B1 | | 4/2003 | Matsumoto et al. | |
| 6,662,073 B1 | * | 12/2003 | Fujishima et al. | .......... 700/173 |

FOREIGN PATENT DOCUMENTS

| | | | | |
|---|---|---|---|---|
| JP | 404262404 A | * | 9/1992 | |
| JP | 2000-235411 | | 8/2000 | |

* cited by examiner

*Primary Examiner*—Leo Picard
*Assistant Examiner*—Chad Rapp
(74) *Attorney, Agent, or Firm*—Pillsbury Winthrop LLP

(57) ABSTRACT

A numerical controlling unit includes: an inputting part into which a machining program is inputted; an analyzing part that analyzes the machining program to generate an instructed spindle rotational speed and calculates a spindle load ratio of a load applied to a spindle under a machining condition according to the machining program to a spindle load caused when the workpiece is machined: and a distributing part that generates, based on the machining program, a distribution amount per unit period inputted into a feed-axis servo driver. A spindle-rotational-amount-command outputting part receives the instructed spindle rotational speed and outputs a spindle-rotational-amount command for commanding a rotational amount per unit period which is inputted into a spindle driver. A cutting-load-for-judgment calculating part calculates a reference torque value based on the spindle load ratio, the distribution amount, and the spindle-rotational-amount command. A spindle-load comparing part compares the reference torque value with a load torque value which is feedback inputted by the spindle driver and outputs a tool-breakage detecting signal when the load torque value is higher than the reference torque value.

4 Claims, 2 Drawing Sheets

NUMERICAL CONTROLLING UNIT HAVING TOOL-BREAKAGE DETECTING FUNCTION

BACKGROUND OF THE INVENTION

1. Field of the Invention

The present invention relates to a numerical controlling unit having a highly accurate tool-breakage detecting function.

2. Description of Related Art

A tool such as a drill is generally attached to a spindle. The tool is rotated by rotating the spindle so that a workpiece is cut by means of a relative speed between the spindle and the workpiece. The spindle is driven in rotation by a rotation of a spindle motor. Thus, when cutting a workpiece, a load caused by the cutting is indicated as an electric current of the servomotor.

If a tool, in particular a cutting edge of a tool, breaks or fails during cutting, a load caused by the cutting is changed, and thus a current of the servomotor is changed. By previously setting a current value indicating a load at a breakage of the tool (cutting edge of the tool) as a reference value, and monitoring the current value of the servomotor which drives a spindle, a tool breakage can be detected when the monitored current value becomes higher than the reference value.

A tool may have a larger or smaller load to be detected depending on cutting conditions such as feed speed and cutting amount.

Although there are different cutting conditions as described above, a higher torque value than a load torque value at an actual tool breakage is used as a reference value so as not to incorrectly detect a breakage. Therefore, when a tool breaks at a cutting step of a lower load, there is the possibility that the tool breakage cannot be detected, because the load torque value does not become higher than the reference value.

In machining a mold, since a load changes greatly, it is difficult to detect a tool breakage by a method in which a single reference value is set per tool.

Japanese Patent Laid-Open Publication No. 2000-235411 (Numerical Controlling Unit Using Machining Information) discloses an invention in which additional tool information such as CAM (Computer Aided Manufacturing) information is added to a machining program, and the information is inputted into a numerical controlling unit so as to control a speed.

A load during cutting can be known by means of the numerical controlling unit according to the above invention.

SUMMARY OF THE INVENTION

An object of the present invention is to solve the above disadvantage, and to provide a numerical controlling unit having a tool-breakage detecting function for accurately detecting a load change caused by a tool breakage.

A numerical controlling unit according to the present invention comprises: an inputting part into which a machining program for machining a workpiece is inputted; an analyzing part that analyzes the machining program to generate an instructed spindle rotational speed and calculates a spindle load ratio indicating a ratio of a load applied to a spindle under a machining condition according to the machining program, with respect to a spindle load being caused when the workpiece is machined under a machining condition of a certain reference; a distributing part that generates, based on the machining program, a distribution amount per unit period to be inputted into a feed-axis servo driver for moving a feed axis; a spindle-rotational-amount-command outputting part that receives the instructed spindle rotational speed and outputs a spindle-rotational-amount command for commanding a rotational amount per unit period; a spindle driver into which the spindle-rotational-amount command is inputted; a cutting-load-for-judgment calculating part that calculates a reference torque value based on the spindle load ratio outputted by the analyzing part, the distribution amount outputted by the distributing part, and the spindle-rotational-amount command outputted by the spindle-rotational-amount-command outputting part; and a spindle-load comparing part that compares the reference torque value with a load torque value which is feedback inputted by the spindle driver and outputs a tool-breakage detecting signal when the load torque value is higher than the reference torque value.

According to the present invention, a load change caused by a breakage of a tool can be more sensitively detected. Thus, even in a step of machining a mold wherein a load change is great, a breakage of a tool can be more accurately detected. The term "a breakage of a tool" includes a breakage of a cutting edge of the tool as well as an excessively abraded state of a cutting edge of the tool.

For example, the machining program may include a feed speed indicating a relative speed between the workpiece and the tool, and additional machining information relating to the workpiece and the tool.

Preferably, a numerical controlling unit according to the present invention further comprises a spindle-override part that instructs a ratio for increasing and decreasing a rotational speed of a spindle, wherein the spindle-rotational-amount-command outputting part generates a spindle-rotational-amount command for commanding the rotational amount per unit period by multiplying the instructed spindle rotational speed by the ratio instructed by the spindle-override part.

A tool-breakage detecting method according to the present invention comprises the steps of: analyzing a machining program for machining a workpiece to generate an instructed spindle rotational speed; calculating a spindle load ratio which indicates a ratio of a load applied to a spindle under a machining condition according to the machining program, with respect to a spindle load being caused when the workpiece is machined under a machining condition of a certain reference; generating, based on the machining program, a distribution amount per unit period to be inputted into a feed-axis servo driver for moving a feed axis; calculating a reference torque value based on the spindle load ratio, the distribution amount, and the spindle-rotational-amount command; and comparing the reference torque value with a load torque value which is feedback inputted by the spindle driver and outputting a tool-breakage detecting error when the load torque value is higher than the reference torque value.

DETAILED DESCRIPTION OF A PREFERRED EMBODIMENT OF THE INVENTION

Figure 1:
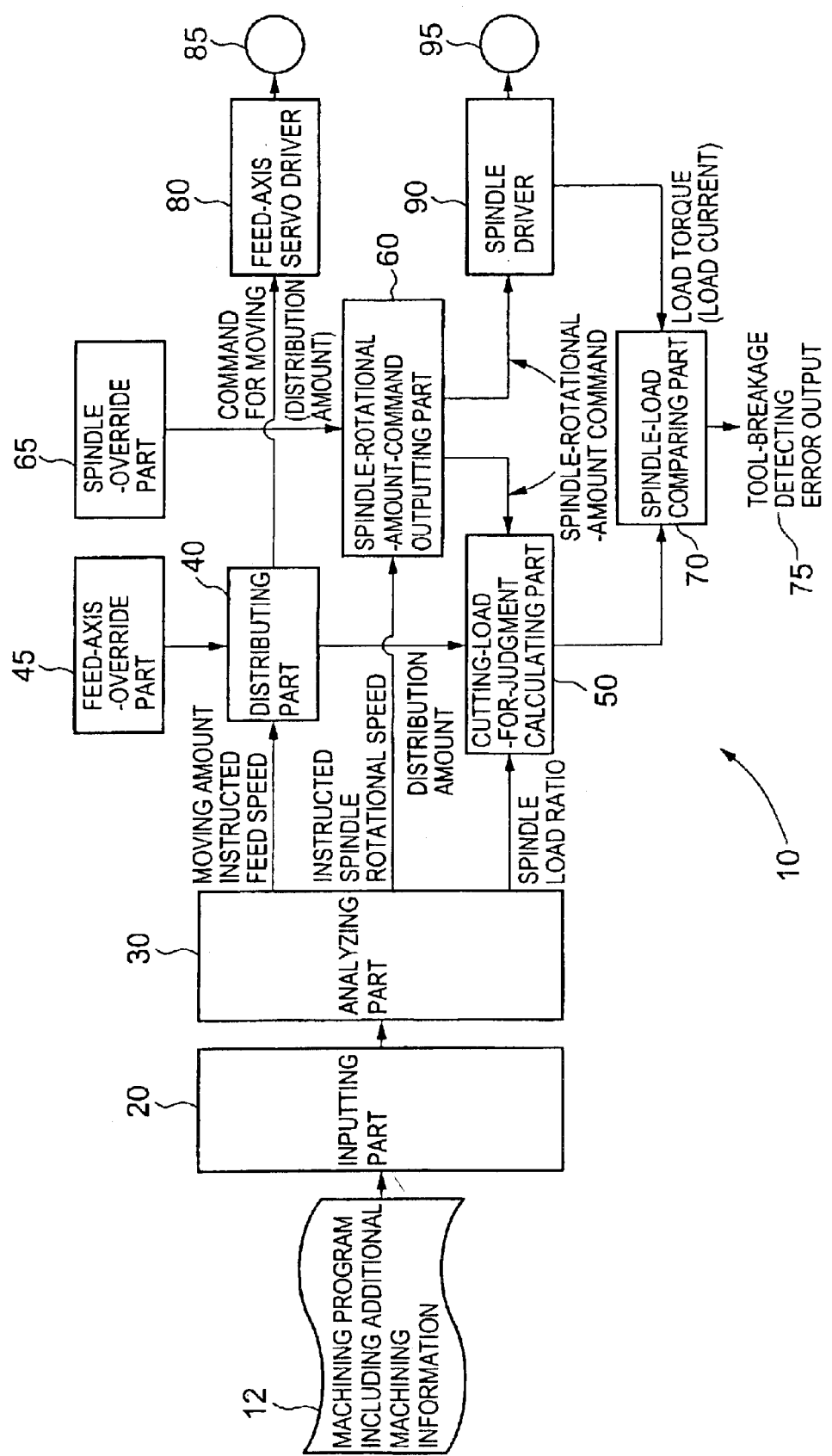
FIG. 1 is a block diagram for explaining a tool-breakage detection flow in an embodiment of a numerical controlling unit according to the present invention.

An embodiment of the present invention is described below with reference to FIG. 1. FIG. 1 is a block diagram showing an embodiment of a numerical controlling unit according to the present invention, relating to a tool-breakage detection. The numerical controlling unit 10 includes block components of an inputting part 20, an analyzing part 30, a distributing part 40, a feed-axis-override part 45, a cutting-load-for-judgment calculating part 50, a spindle-rotational-amount-command outputting part 60, a spindle-override part 65, a spindle-load comparing part 70, a feed-axis servo driver 80, a feed-axis servomotor 85, a spindle driver 90, and a spindle motor 95.

Each of the above block components is described below.

A machining program 12 instructed for machining a workpiece is inputted into the inputting part 20. The machining program 12 includes a feed speed indicating a relative speed between the workpiece and a tool, and additional machining information relating to the workpiece and the tool. Examples of the additional machining information may be a cutting amount for a workpiece to be cut per cutting, and information indicating relationship between a rotating direction and a cutting direction of the tool (up-cut way or down-cut way), and so on.

Figure 2:
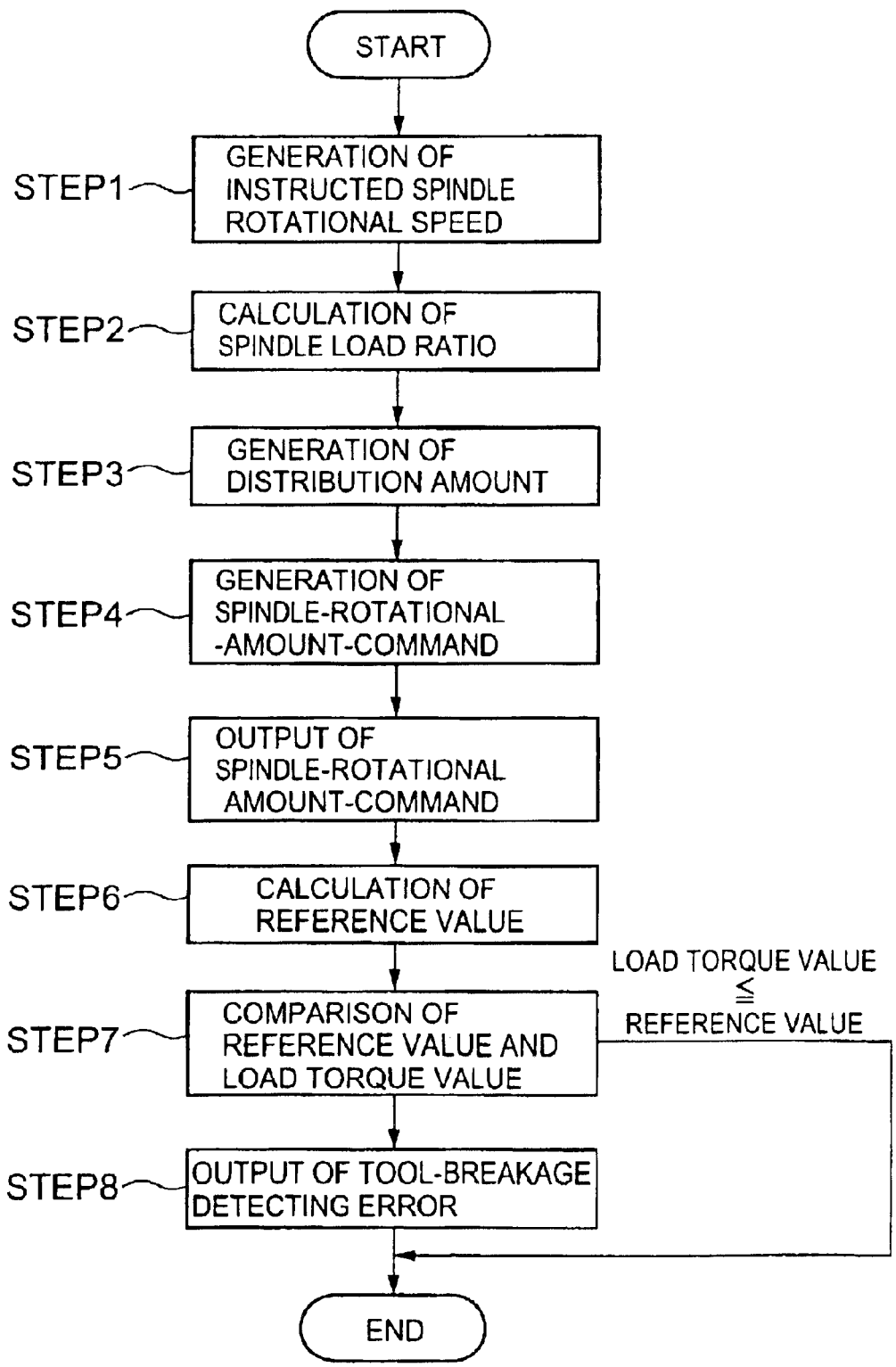
FIG. 2 is a flow chart showing an example of operation of a numerical controlling unit according to the present invention.

The analyzing part 30 analyzes the machining program 12 including the additional machining information. Thus, a moving amount and an instructed feed speed of each axis and an instructed spindle rotational speed are generated (see FIG. 2, STEP 1), and a spindle load ratio is calculated which indicates a ratio of a load applied to a spindle under a machining condition according to the machining program, with respect to a spindle load being caused when the workpiece is machined under a machining condition of a certain reference (STEP 2).

The moving amount and the instructed feed speed of each axis are inputted into the distributing part 40. The spindle load ratio is inputted into the cutting-load-for-judgment calculating part 50. The instructed spindle rotational speed is inputted into the spindle-rotational-amount-command outputting part 60.

The distributing part 40 generates for each axis a distribution amount which indicates a moving amount per unit period as a command for moving (STEP 3), based on a ratio indicated by the feed-axis-override part 45 and the moving amount and the instructed feed speed inputted from the analyzing part 30. The distribution amount is inputted into the feed-axis servo driver 80.

The feed-axis-override part 45 serves to accelerate or decelerate a feed speed depending on the ratio indicated by the feed-axis-override part 45.

The spindle-rotational-amount-command outputting part 60 generates a spindle-rotational-amount command for commanding a rotational amount per unit period (STEP 4), based on a ratio indicated by the spindle-override part 65 and the instructed spindle rotational speed inputted from the analyzing part 30. To be more specific, the spindle-rotational-amount-command outputting part 60 generates the spindle-rotational-amount command for commanding a rotational amount per unit period by multiplying the instructed spindle-rotational speed by the ratio indicated by the spindle-override part 65. The spindle-rotational-amount command is inputted into the spindle driver 90 (STEP 5). The spindle-rotational-amount command is also inputted into the cutting-load-for-judgment calculating part 50.

The spindle-override part 65 serves to change a ratio of the instructed rotational-amount command.

The cutting-load-for-judgment calculating part 50 generates a reference value for a cutting load (STEP 6), through a calculation based on the spindle load ratio inputted by the analyzing part 30, the distribution amount inputted by the distributing part 40, and the spindle-rotational-amount command for commanding a rotational amount per unit period outputted from the spindle-rotational-amount-command outputting part 60. The reference value is inputted into the spindle-load comparing part 70.

The spindle-load comparing part 70 compares the reference value generated by the cutting-load-for judgment calculating part 50 with a load torque value (described hereafter) inputted from the spindle driver 90 (STEP 7), and outputs a tool-breakage detecting error output 75 (STEP 8) based on the compared result.

The feed-axis servo driver 80 drives the feed-axis servomotor 85 according to the distribution amount as a command for moving, which is inputted thereinto by the distributing part 40.

The spindle driver 90 drives the spindle motor 95 according to the spindle-rotational-amount command, which is inputted thereinto by the spindle-rotational-amount-command outputting part 60.

An electric current indicating a load torque detected by the spindle driver 90 is feedback inputted into the spindle-load comparing part 70. Then, the reference value and the current value are compared with each other in the spindle-load comparing part 70. When the current value is higher than the reference value, the tool-breakage detecting error signal 75 indicating a breakage of the tool is outputted.

That is, while a theoretical load at any time is calculated based on the additional machining information added to the machining program, an actual load is detected. A comparison thereof allows a highly accurate detection of a load change caused by a tool breakage.

The analyzing part 30, the distributing part 40, the cutting-load-for-judgment calculating part 50, the spindle-rotational-amount-command outputting part 60, and the spindle-load comparing part 70 of the numerical controlling unit 10 are generally achieved by means of a controlling program executed by a CPU.

What is claimed is:

1. A numerical controlling unit comprising:
   an inputting part into which a machining program for machining a workpiece is inputted;
   an analyzing part that analyzes the machining program to generate an instructed spindle rotational speed and calculates a spindle load ratio indicating a ratio of a load applied to a spindle under a machining condition according to the machining program, with respect to a spindle load being caused when the workpiece is machined under a machining condition of a certain reference;
   a distributing part that generates, based on the machining program, a distribution amount per unit period to be inputted into a feed-axis servo driver for moving a feed axis;
   a spindle-rotational-amount-command outputting part that receives the instructed spindle rotational speed and outputs a spindle-rotational-amount command for commanding a rotational amount per unit period;
   a spindle driver into which the spindle-rotational-amount command is inputted;
   a cutting-load-for-judgment calculating part that calculates a reference torque value based on the spindle load ratio outputted by the analyzing part, the distribution amount outputted by the distributing part, and the spindle-rotational-amount command outputted by the spindle-rotational-amount-command outputting part; and a spindle-load comparing part that compares the reference torque value with a load torque value which is feedback inputted by the spindle driver and outputs a tool-breakage detecting signal when the load torque value is higher than the reference torque value.

2. A numerical controlling unit according to claim 1, wherein the machining program includes a feed speed indicating a relative speed between the workpiece and a tool, and additional machining information relating to the workpiece and the tool.

3. A numerical controlling unit according to claim 1, further comprising:

a spindle-override part that instructs a ratio for increasing and decreasing a rotational speed of a spindle, wherein the spindle-rotational-amount-command outputting part generates a spindle-rotational-amount command for commanding the rotational amount per unit period by multiplying the instructed spindle rotational speed by the ratio instructed by the spindle-override part.

4. A numerical controlling unit according to claim 2, further comprising:

a spindle-override part that instructs a ratio for increasing and decreasing a rotational speed of a spindle, wherein the spindle-rotational-amount-command outputting part generates a spindle-rotational-amount command for commanding the rotational amount per unit period by multiplying the instructed spindle rotational speed by the ratio instructed by the spindle-override part.

* * * * *